United States Patent [19]

Beck

[11] Patent Number: 5,676,050
[45] Date of Patent: Oct. 14, 1997

[54] CAKE MOLD

[75] Inventor: Ernst Beck, Aichach-Oberwittelsbach, Germany

[73] Assignee: H. Zenker GmbH & Co. KG Metallwarenfabrik, Aichach, Germany

[21] Appl. No.: 675,336

[22] Filed: Jun. 21, 1996

[30] Foreign Application Priority Data

Jun. 23, 1995 [DE] Germany .................. 195 23 727.7
Jan. 19, 1996 [DE] Germany .................. 196 03 074.9

[51] Int. Cl.⁶ .................. A22C 7/00; A23P 1/00; A47J 43/18
[52] U.S. Cl. .................. 99/428; 99/442; 99/DIG. 15; 249/DIG. 1
[58] Field of Search .................. 99/428, 442, 426, 99/DIG. 15, 432; 249/DIG. 1, 102, 155, 117; D7/354

[56] References Cited

U.S. PATENT DOCUMENTS 4,395,015  7/1983  Reardon .................. 99/428 X
4,452,419  6/1984  Saleeba .................. 249/DIG. 1 X

FOREIGN PATENT DOCUMENTS 8402224  4/1984  Germany .
9116032  3/1993  Germany .
9413132  1/1995  Germany .
229463   2/1925  United Kingdom ............ 99/DIG. 15

Primary Examiner—David Scherbel
Assistant Examiner—Reginald L. Alexander
Attorney, Agent, or Firm—Christie, Parker & Hale, LLP

[57] ABSTRACT

A cake mold includes a base having a number of receptacles disposed thereon, and ring-shaped side parts of different diameters that are adapted for inserting into corresponding receptacles. The side parts are independent of and separate from the base. In one embodiment, the receptacles are in the form of concentric grooves that are arranged in a circular patterns. In another embodiment, the receptacles are in the form of slits that are arranged in concentric circular patterns, and that are staggered with respect to one another. The side parts each include a lower edge that is adapted to be inserted into a corresponding groove or slit. In another embodiment, the side part has a variable diameter side wall with radial ends that are adapted to slidably engage one another to permit making cakes of different diameters. In still another embodiment, the base comprises a number of concentrically arranged circular ring elements that are interconnected within one another along inside and outside diameter edges, and the side parts are adapted to fit against and outside diameter edge of an outermost ring element. Cakes of different diameter are made by positioning the side part having a desired diameter into a corresponding receptacle in or outer diameter edge of the base.

13 Claims, 3 Drawing Sheets

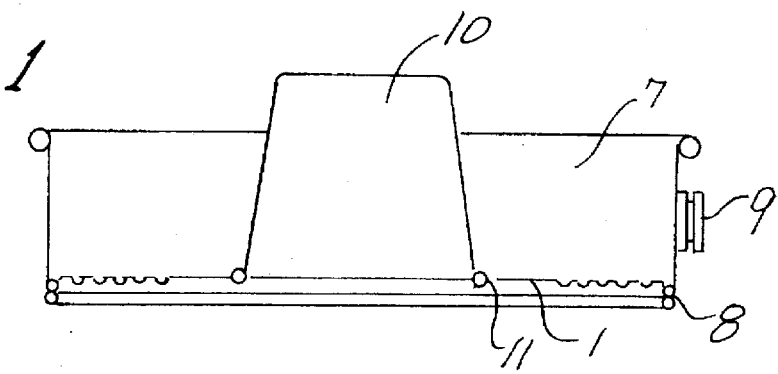
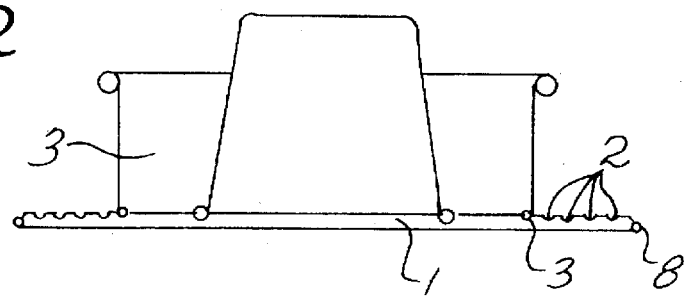
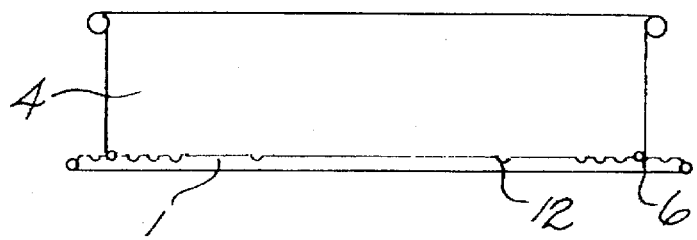
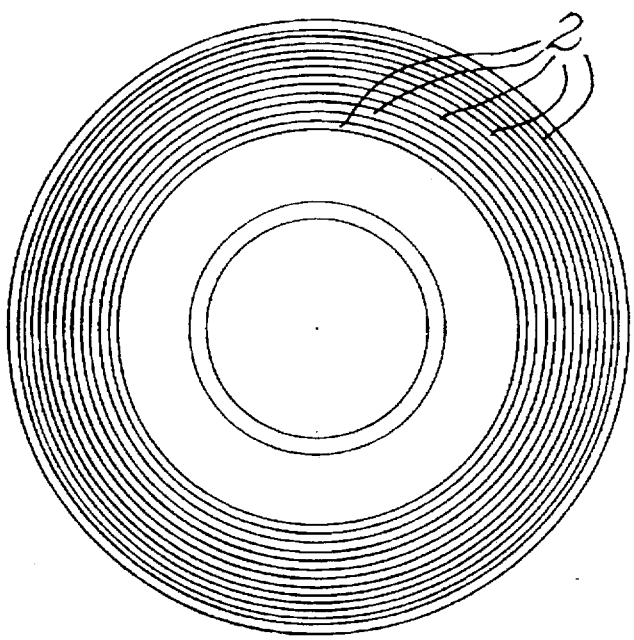

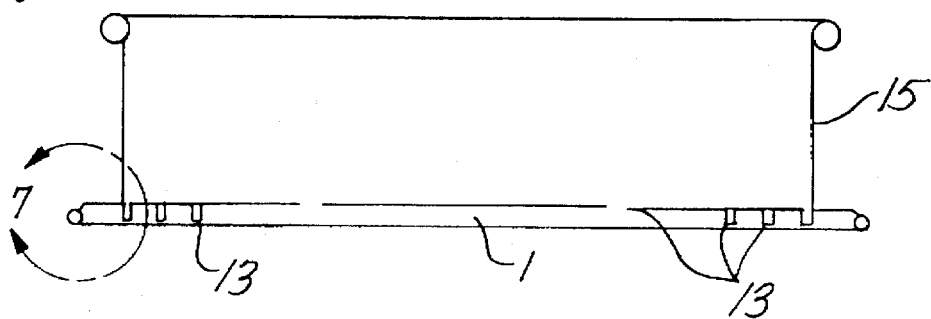
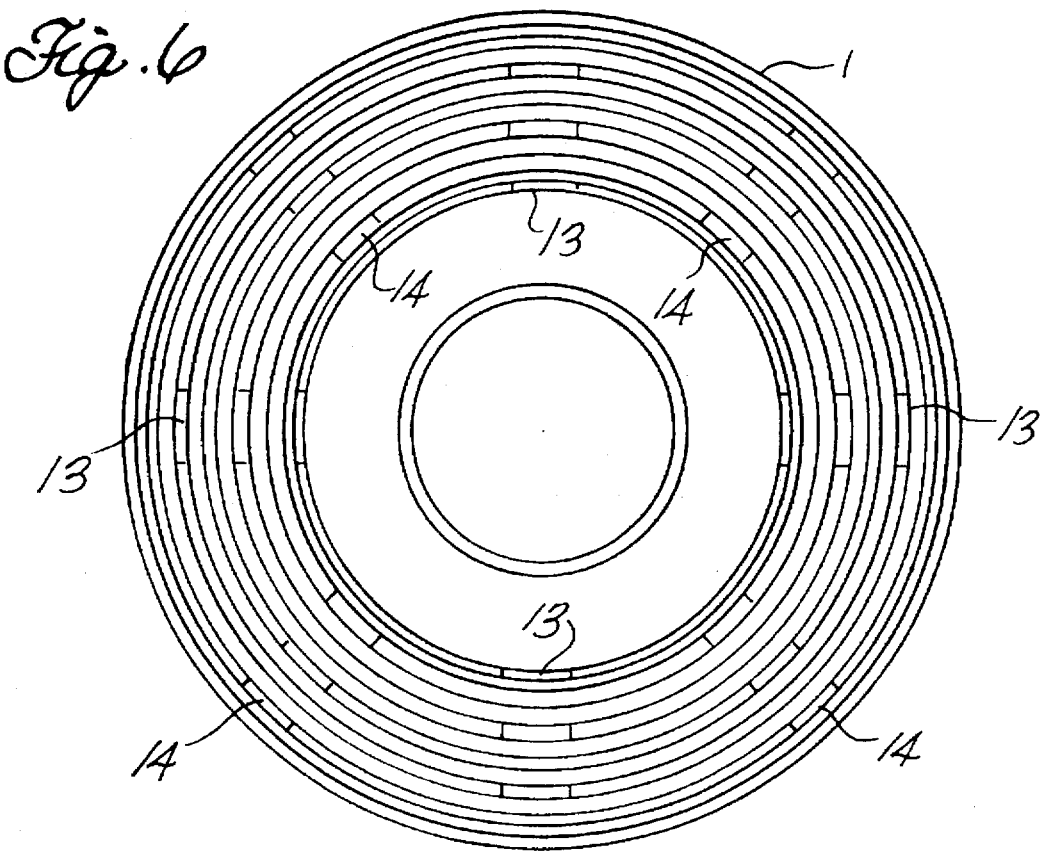
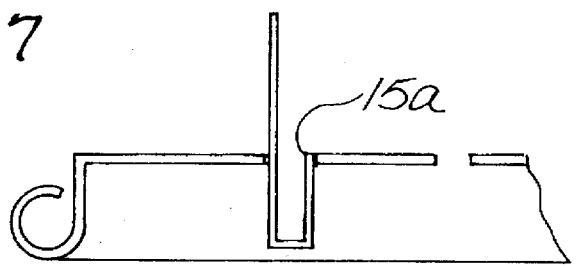

CAKE MOLD

FIELD OF THE INVENTION

Invention relates to a cake mold and, more particularly, to a cake mold adapted to form cakes having different diameters.

BACKGROUND OF THE INVENTION

Cake mold constructions having separate bases and side parts are known. The best known of such cake mold constructions is the springform, where the side parts are pressed against the edge of the base by means of a spring closure. Also known cake mold constructions are those having a side part that is closed by itself extending upwards conically onto which a base may be inserted.

A common disadvantage of these cake mold constructions is that each cake mold can be used for the production of only one specific cake size, i.e., a specific cake diameter. Thus, to produce cakes of different sizes, different cake molds of various sizes are required. The need to rely on many such differently sized cake molds not only requires additional storage space, but involves the extra cost of purchasing such differently sized molds.

It is, therefore, desirable to provide a cake mold construction that is suited for producing cakes of varying sizes, i.e., varying diameter, both without the need for additional storage area, and without the need of additional expense.

SUMMARY OF THE INVENTION

A cake mold constructed according to principles of this invention includes a base having a number of receptacles disposed thereon, and ring-shaped side parts each having cylindrically-shaped side walls of different diameters. The side parts are independent of and separate from the base. In one embodiment, the receptacles are in the form of grooves that are each concentrically arranged in a circular pattern along a surface of the base. In another embodiment, the receptacles are in the form of slits that are concentrically arranged in a circular patterns through the base surface. The slits in each circular pattern are staggered with respect to other slits in adjacent circular patterns to maximize the structural integrity of the base.

The side parts each include a lower edge that is adapted to promote insertion into a corresponding groove or slit. The side walls of each side part have a different radius of curvature that corresponds to the circular pattern of grooves or slits in the base. Accordingly, cakes of different sizes are made by using the same base and selecting a side part of appropriate diameter.

In another embodiment, the side part has a variable diameter side wall with radial ends that are adapted to slidably engage one another. In such embodiment, cakes of different diameters are made using the same base and by sliding the ends together an appropriate amount.

In still another embodiment, the base is formed from a number of concentrically arranged circular ring elements that are interconnected within one another along inside and outside diameter edges. Side parts useful with such embodiment are adapted to fit against an outside diameter edge of an outermost ring element.

Cake molds constructed according to principles of this invention allow cakes of different diameter to be made by positioning the side part having a desired diameter into a corresponding receptacle of the base, or positioning the side part having a desired diameter over an outermost edge of the base.

BRIEF DESCRIPTION OF THE DRAWINGS

These and other features and advantages will become appreciated as the same becomes better understood with reference to the specification, claims and drawings wherein:

FIG. 1 is a cross-sectional side view of a cake mold constructed according to the invention having a springform part and a tube insert attached to a base;

FIG. 2 is a cross-sectional side view of a cake mold constructed according to the invention having small diameter side parts and a tube insert positioned on the base;

FIG. 3 is a cross-sectional side view a of a cake mold constructed according to the invention having medium diameter side parts and a tube insert positioned on the base;

FIG. 4 is a top plan view of a base part;

FIG. 5 is a cross-sectional side view of a cake mold constructed according to the invention having slits disposed within a base part;

FIG. 6 is a top plan view of the base part comprising slits;

FIG. 7 is an enlarged cross-sectional side view of detail 7 in FIG. 5;

DETAILED DESCRIPTION

Figure 8:
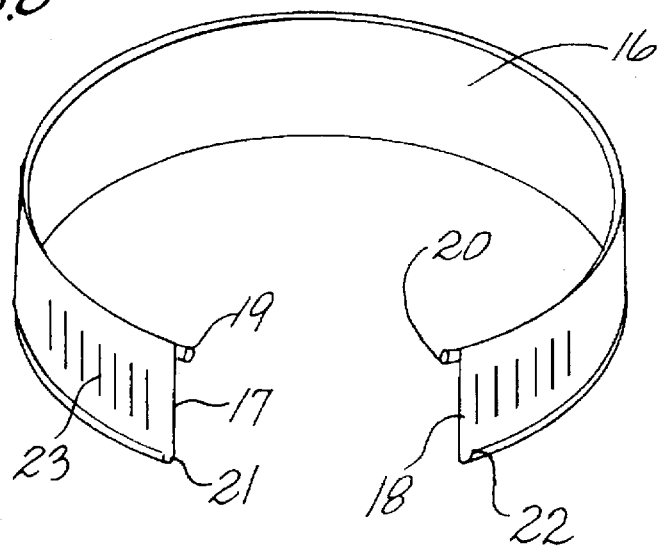
FIG. 8 is a perspective view of a side part.

A cake mold, constructed according to principles of this invention, comprises a base and annular side parts independent from the base. The base includes a number of receptacles for accommodating attachment with annular side parts having various different diameters. The cake mold is advantageous because it permits cakes having different sizes to be produced by using only one mold. The cake mold achieves this by selecting a side part having the desired size and positioning the same into the corresponding receptacle in the base.

Referring to FIGS. 2–4, one embodiment of a cake mold, constructed according to principles of this invention, comprises a base part 1, which includes a number of receptacles 2. Preferably, the receptacles 2 are provided in the form of concentric circular grooves, whereby each groove runs along the base in its own closed track. In the present exemplary embodiment, these grooves have a semi-circular cross-sectional shape or profile The cross-sectional shape or profile of the grooves is not limited to a semi-circular shape, and it is to be understood that other cross-sectional shapes are intended to be within the scope of this invention. For example, the cross-sectional shape of the grooves may be rectangular or V-shaped.

Each groove 2 is coordinated in size and shape with an annular side part. In FIGS. 2 and 3 only two side parts 3 and 4 have been illustrated for purposes of reference and clarity. The side parts have a radius of curvature the corresponds to a respective groove. Each side part 3 and 4 comprises a lower flanged edge 5 or 6, respectively. The lower flanged edges 5 and 6 each have a circular cross-sectional shape or profile to facilitate insertion into a groove having of the corresponding diameter. FIG. 2 illustrates the cake mold having a side part 3 with the smallest diameter positioned on the base 1. FIG. 3 illustrates the cake mold having a side part 4 with a medium diameter positioned on the base 1. In such embodiment, the loose insertion of the side parts into the grooves is sufficient for the placement of dough and for the baking process of the cake. Additional fastening is not necessary.

Additional fastening of the side part, however, is necessary at the edge of the base. Accordingly, of the side parts provided, at least one is adapted to be attached to the outside edge of the base and is designed as a springform. However, it is to be understood within the scope of this invention that closed rings may also be provided as side parts in conjunction with the base. In particular, in such embodiment the side parts may have an increasing diameter starting on the base, i.e., the side parts are cone shaped. Referring to FIG. 1, fastening the side part at the edge of the base is accomplished by using a prior art springform part 7 and a springform edge 8, also prior art, that is coordinated at the base 1. The adjustment, i.e., loosening and tightening, of the springform part 7 is achieved in a known manner by means of a tension closure 9.

FIGS. 1 and 2 also illustrate a conic tube insert 10 installed onto the base 1 of the cake mold. The conic tube comprises a lower edge 11 that is configured to engage an additional groove 12 (shown in FIG. 3) of the base 1. A cake mold constructed in this manner can be used to bake pastries having different diameters by using the same base and differently sized side parts. The use of the tube insert 10 positioned on the base allows ring pastries of varying diameters to be baked.

FIGS. 5 through 7 illustrate other embodiments of the cake mold, constructed according to principles of this invention, wherein the base 1 comprises a number of receptacles 13 and 14 in the form of having a number of slits 13, 14 disposed therein. The slits 13 and 14 are arranged in a concentric circular pattern along the base surface. For purposes of illustration and reference, the circles shown in FIG. 6 are intended to represent the circular nature of their arrangement, and do not represent circular grooves as shown in FIG. 4.

The slits in each adjacent concentric circular pattern are staggered relative to one another. Thus, the slits 13 are arranged in an inner circle at an interval of 90°. The slits 14 in the adjacent outward circle are also arranged at an interval of 90°. However, the slits 13 are staggered by approximately 45° with respect to the slits 14. This staggered arrangement of the slits prevents impairment of the stability of the base.

The side parts 15 includes a number of sections 15a that extend downwardly from its lower edge. As shown in FIG. 7, the sections have a U-shaped cross-sectional shape or profile. In such embodiment, the lower edge of the side parts rest on top of the otherwise flat base surface, and the sections 15a of the side parts engage corresponding slits to lock the side part 15 into place with the base and to prevent lateral displacement of the side parts. To prevent the occurrence of any leakage through the slits when filling the mold with liquid dough, the base can be covered by means of baking paper in known manner.

Referring to FIG. 8, a still other embodiment of a cake mold comprises a base, identical to that described and illustrated in FIGS. 1–3, and one or more side part(s) 16 in the form of an annular strip that is pre-bent and/or bendable into a circular form that roughly corresponds in diameter to the receptacles in the base. Side parts constructed in this manner include radial ends 17 and 18 that are adapted to slide over one another so that the side part 16 forms a closed circular shape. The side part 16 includes axial upper and lower edges formed as hollow flanges that flanged differently to form complementary end sections 19 and 20 at the upper edge of each respective end 17 and 18, and complementary end sections 21 and 22 at the bottom edge of each respective end 17 and 18.

In such embodiment, it is possible to reduce the number of side parts that are necessary to make cakes of varying sizes. Differences in cake sizes, i.e., cake diameters, can be achieved within a few centimeters by adjusting the amount that the radial ends of the side part slide into each other. In a preferred embodiment, each side part is configured to form cakes having at least two different diameters. To achieve specific or fixed diameters using such strip-shaped side parts, it is advantageous that locking elements 23 in the form of corrugations or the like, be disposed along a side wall of the side parts.

In addition to the receptacles disposed in the base for accommodating the side parts, the base can comprise a receptacle for accommodating placement of a lower edge of a tube insert therein. The use of such tube insert allow for baking ring pastries of various different sizes.

Figure 9:
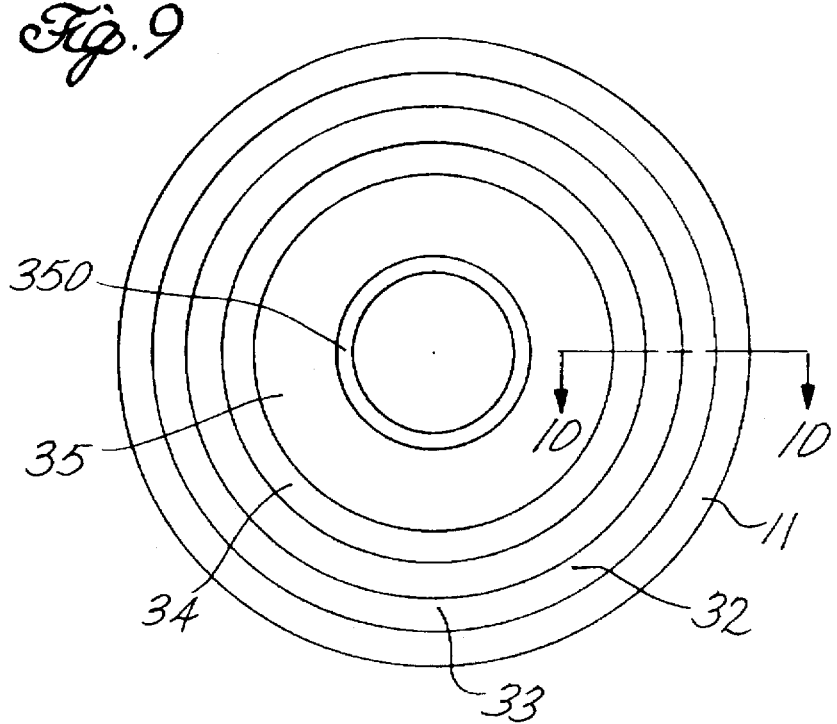
FIG. 9 is a top plan view of a base part comprising a number of circular ring elements.
Figure 10:
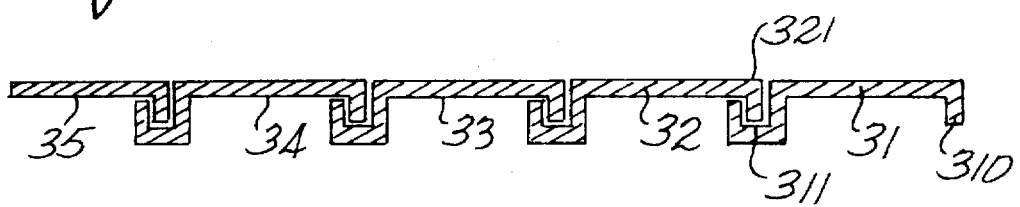
FIG. 10 is an enlarged cross-sectional side view of section 10—10 in FIG. 9.

Referring to FIGS. 9–10, a still other embodiment of a cake mold, constructed according to principles of this invention, comprises a base formed from a number of concentric circular ring elements 31–34 and a center circular plate 35. In such embodiment, the ring elements 31–34, and the center circular plate 35, are configured to engage one another. The center circular plate 35 has a receptacle 350 accommodating placement of a cone-shaped tube insert therein.

Referring to FIG. 10, the outer circular ring element, that is, the circular ring element 31 with the largest diameter, has a tab or tongue 310 that is positioned at an outside diameter of the ring, and that extends downwardly and away from a bottom surface of the ring. The circular ring element 31 also has a groove 311 disposed along a top surface of the ring, and that is positioned at an inside diameter of the ring. Each of the ring element 31–34 comprise the same tab and groove as described above for ring element 31. The tabs and grooves are configured to accommodate engagement with one another to permit connection between adjacent ring elements of progressively different concentric sizes. The center circular plate 35 also has a tab at its outside diameter to facilitate connection with adjacent ring element 34 via engagement with the groove of ring element.

The cake mold, comprising a base made from such ring element, is intended to used with a springform part (not shown) that can be attached to the outside diameter edge of the last ring element. Due to this design, the circular ring elements 31 to 34, as well as the center circular plate, are supported against each other, when a springform part having a receiving groove engages around the downward extending tab of the outermost circular ring element.

In such embodiment as well, a baking paper, a baking foil, or the like having an appropriate diameter may be positioned on the upper part of the circular ring elements 31 through 34 or the circular base 35 in order to achieve an even resting surface for baked goods.

Although circular ring elements 31 and 34 have been illustrated having uniform widths, it is to be understood within the scope of this invention that the circular ring elements may be configured having different widths to achieve different diameter progressions. Additionally, although the tabs 310 and grooves 311 are illustrated as having a rectangular cross-sectional shape or profile, it is understood that the tabs and grooves may be configured having different complementary shapes, such as triangular, trapezoidal, semicircular, or the like. It is also to be understood within the scope of this invention that a positive locking connection of the individual circular ring elements 31 to 34 be provided, for example by means of conic clamping fittings.

The disclosures of attached German patent application 195 23 727.7, filed on Jun. 23, 1995, and German patent application (number to be announced), filed on Jan. 1, 1996, are incorporated fully herein by reference. Priority of these German patent applications is claimed.

Although limited embodiments of a cake mold been specifically described and illustrated herein, many modifications and variations will be apparent to those skilled in the art. Accordingly, it is to be understood that, within the scope of the appended claims, the cake mold according to principles of this invention may be embodied other than as specifically described herein.

What is claimed is:

1. A cake mold comprising:

a base having a plurality of grooves running along a different location on a surface of the base, wherein each said groove has a semicircular cross-sectional shape; and at least one side part, the side part being separate and independent from the base and being adapted for engagement with a corresponding groove, wherein each said at least one side part includes a lower edge adapted for insertion into a corresponding groove, and wherein each said at least one side part is sized differently to correspond with one of the grooves, and wherein the lower edge of each said at least one side part has a complementary cross-sectional shape to fit within a corresponding semicircular groove.

2. The cake mold according to claim 1 wherein a side part sized to correspond with an outside edge of the base is in the form of a springform part that is fastened thereto.

3. A cake mold comprising:

a base having a plurality of grooves running along a different location on a surface of the base, wherein the grooves have a semicircular cross-sectional shape;

a cylindrical side part that is adapted to provide a variable wall diameter, the side part being separate and independent from the base, wherein the grooves are adapted to engage the side part, wherein the side part includes a lower edge adapted for insertion into a corresponding groove, and wherein the lower edge of the side part has a complementary cross-sectional shape to fit within a corresponding semicircular groove.

4. The cake mold according to claim 3 wherein a side part sized to correspond with an an outside edge of the base is in the form of a springform part that is fastened thereto.

5. A cake mold comprising:

a base having a plurality of receptacles disposed along a surface portion of the base;

a cylindrical side part that is adapted to provide a variable wall diameter, the side part being separate and independent from the base, wherein the receptacles are adapted to engage the side part, wherein the side part includes a cylindrically-shaped wall having a radius of curvature approximately equal to a corresponding receptacle, and wherein the side part includes flanged upper and lower axial edges adapted to permit adjacent side part radial ends to slide over one another.

6. The cake mold according to claim 5 further comprising means disposed along the side part wall for locking the radial ends together to form side part of predetermined diameter.

7. The cake mold according to claim 6 wherein the means for locking are corrugations.

8. A cake mold comprising:

a base formed from a number of concentrically arranged circular ring elements that are interconnected within one another along inside and outside diameter edges; and a side part independent and separate from the base, the side part being adapted for connection with an outside diameter edge of an outermost ring element.

9. The cake mold according to claim 8 wherein the base further comprises a circular center plate, wherein an innermost circular ring element is attached around an outside diameter edge of the center plate.

10. The cake mold according to claim 9 further comprising a cone-shaped insert disposed on the center plate.

11. The cake mold according to claim 8 wherein the circular ring elements are connected to each other by a groove and tongue connection.

12. A cake mold comprising:

a substantially flat disc-shaped base comprising a plurality of concentrically slits arranged in a circular pattern, the slits being disposed through a surface of the base, wherein the slits are arranged in a circular pattern so that they are staggered with respect to the slits in an adjacent concentric circular pattern; and at least one side part having a cylindrically-shaped wall, wherein the wall has a radius of curvature approximately equal to one of the circular patterns, and wherein each said at least one side part includes a lower end that has a section extending therefrom adapted for insertion into a corresponding slit.

13. A cake mold comprising:

a substantially flat disc-shaped base comprising a number of concentrically arranged receptacles disposed along a surface of the base; and at least one side part having a cylindrically-shaped variable diameter wall surface, wherein the side part includes upper and lower axial edges and two radial ends, wherein the upper and lower edges are adapted to permit slidable engagement of the two ends with one another, and wherein the lower edge is adapted to engage a corresponding receptacle.

\* \* \* \* \*